(12) United States Patent
Friedmann et al.

(10) Patent No.: US 12,536,140 B2
(45) Date of Patent: Jan. 27, 2026

(54) ADAPTIVE AGGREGATION AND COMPRESSION OF METADATA

(71) Applicant: Red Hat, Inc., Raleigh, NC (US)

(72) Inventors: Or Friedmann, Ra'anana (IL); Gabriel Zvi BenHanokh, Ra'anana (IL)

(73) Assignee: Red Hat, Inc., Raleigh, NC (US)

(*) Notice: Subject to any disclaimer, the term of this patent is extended or adjusted under 35 U.S.C. 154(b) by 94 days.

(21) Appl. No.: 18/073,123

(22) Filed: Dec. 1, 2022

(65) Prior Publication Data

US 2024/0184750 A1 Jun. 6, 2024

(51) Int. Cl.
*G06F 16/174* (2019.01)
*G06F 9/455* (2018.01)

(52) U.S. Cl.
CPC ...... *G06F 16/1744* (2019.01); *G06F 9/45558* (2013.01)

(58) Field of Classification Search
CPC .......................... G06F 16/1744; G06F 9/45558
See application file for complete search history.

(56) References Cited

U.S. PATENT DOCUMENTS

| | | | |
|---|---|---|---|
| 9,696,931 B2 | 7/2017 | Kuttner et al. | |
| 10,191,857 B1 | 1/2019 | Shalev | |
| 10,558,618 B1 * | 2/2020 | Bent | G06F 16/13 |
| 11,494,362 B2 | 11/2022 | Gerweck et al. | |
| 2020/0387316 A1 * | 12/2020 | Cheah | G06F 13/20 |
| 2022/0300451 A1 | 9/2022 | Ghosh et al. | |

FOREIGN PATENT DOCUMENTS

| | | | |
|---|---|---|---|
| CN | 113468175 A | * | 10/2021 |
| WO | WO2021150165 A1 | | 7/2021 |

OTHER PUBLICATIONS

Yanping, Lin, et al. "A Dynamic Method for Metadata Partitioning Based on Intensive Access of Spatial Data," 2011, State Key Laboratory for Information Engineering in Surveying, Mapping and Remote Sensing, Wuhan University, China, pp. 177-180.

* cited by examiner

*Primary Examiner* — Van H Oberly
*Assistant Examiner* — Samuel C Sharpless, III
(74) *Attorney, Agent, or Firm* — Kilpatrick Townsend & Stockton LLP

(57) ABSTRACT

Systems, methods, and non-transitory machine-readable medium storing a program are disclosed for aggregating and compressing a plurality of metadata attributes related to an object. For example, a system including a memory and a processor in communication with the memory, where the processor is configured to: measure an access pattern for the plurality of metadata attributes, apply an assigned weight to each of the metadata attributes, calculate an individual prediction for each of the metadata attributes, compare the individual prediction for each of the metadata attributes to a threshold, form a combined attribute with aggregated metadata attributes having individual predictions above the threshold, and compress the combined attribute.

18 Claims, 3 Drawing Sheets

ADAPTIVE AGGREGATION AND COMPRESSION OF METADATA

BACKGROUND

Object storage allows rich and detailed metadata attributes (e.g., herein "metadata attributes", "metadata keys", "metadata files", or simply "metadata") to be related to one or more object files. For example, the metadata may describe various attributes of the object, provide information related to the creation of the object (e.g., author or creation date), set access permissions to the object, or provide quantitative or qualitative descriptions or statistics about the object. While useful to the user of the objects, the metadata can however consume significant data storage capacity.

SUMMARY

The present disclosure provides new and innovative systems and methods for reducing metadata footprint and for increasing the speed of metadata storage and retrieval operations. In an example, a system for aggregating and compressing a plurality of metadata attributes related to an object, the system including: a memory, and a processor in communication with the memory. The processor is configured to: measure an access pattern for the plurality of metadata attributes, apply an assigned weight to each of the metadata attributes, calculate an individual prediction for each of the metadata attributes, compare the individual prediction for each of the metadata attributes to a threshold form a combined attribute with aggregated metadata attributes having individual predictions above the threshold, and compress the combined attribute.

In an example, a method for aggregating and compressing a plurality of metadata attributes related to an object, the method including: measuring an access pattern for the plurality of metadata attributes, applying an assigned weight to each of the metadata attributes, calculating an individual prediction for each of the metadata attributes, comparing the individual prediction for each of the metadata attributes to a threshold, forming a combined attribute with aggregated metadata attributes having individual predictions above the threshold, and compressing the combined attribute.

In an example, a non-transitory machine-readable medium storing a program, which when executed by at least one processor, is effective to aggregate and compress a plurality of metadata attributes related to an object. The program including: measure an access pattern for the plurality of metadata attributes, apply an assigned weight to each of the metadata attributes, calculate an individual prediction for each of the metadata attributes, compare the individual prediction for each of the metadata attributes to a threshold, form a combined attribute with aggregated metadata attributes having individual predictions above the threshold, and compress the combined attribute.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
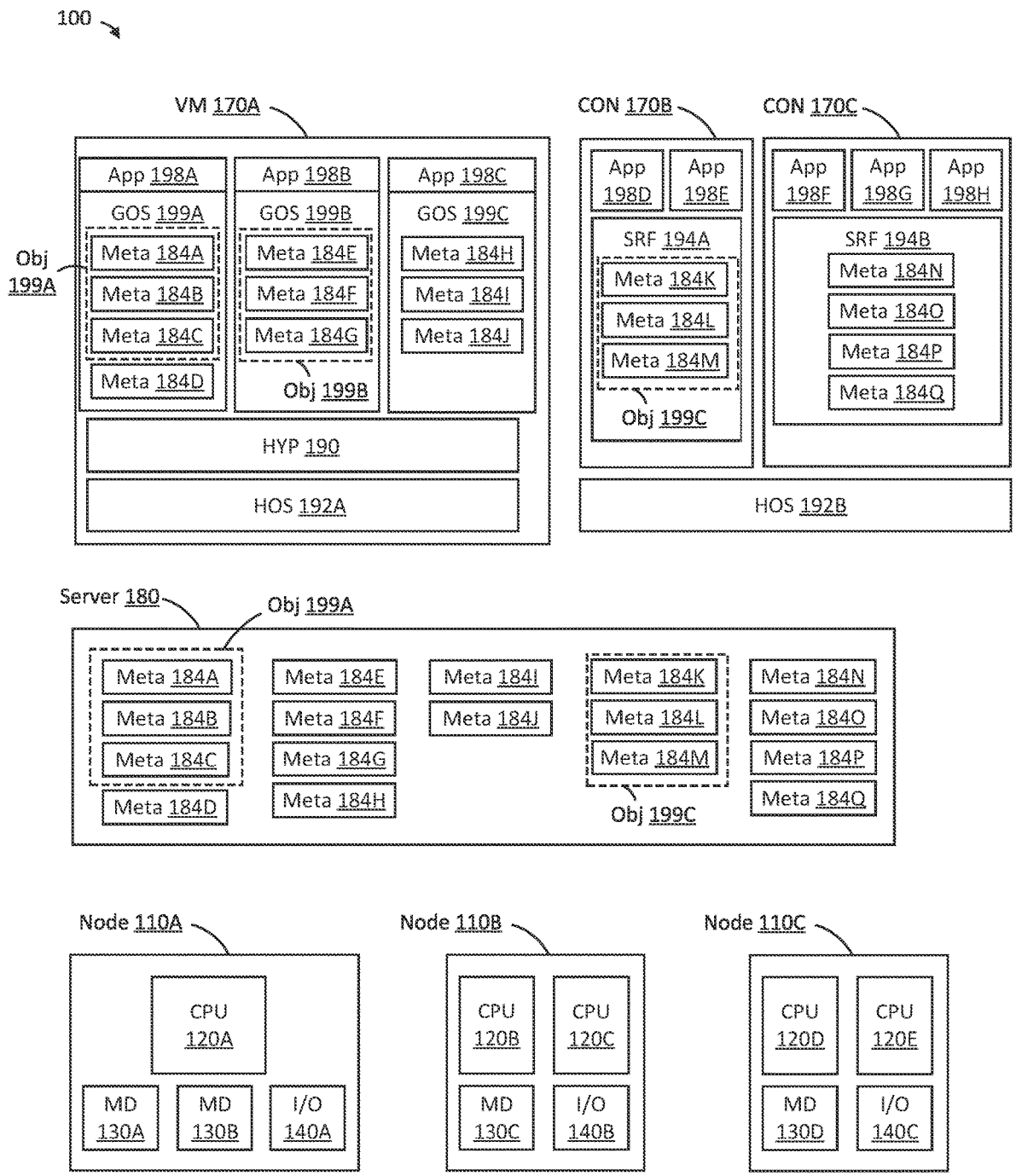
FIG. 1 illustrates a block diagram of a computing system according to an example embodiment of the present disclosure.

Object storage allows rich and detailed metadata attributes (e.g., herein "metadata attributes", "metadata keys", "metadata files", or simply "metadata") to be related to one or more object files. For example, the metadata may describe various attributes of the object, provide information related to the creation of the object (e.g., author or creation date), set access permissions to the object, or provide quantitative or qualitative descriptions or statistics about the object. While useful to the user of the objects, the metadata can however consume significant data storage capacity. Thus, in many instances, it is advantageous to compress the metadata attributes to form a smaller file size so that less data storage capacity is needed. In addition, in many instances, it is also an advantage from a data transfer perspective because a smaller metadata attribute size can be transferred faster given a particular bandwidth.

However, compression of metadata attributes may also be counterproductive in some instances, for example when each of the metadata attributes for a particular object is relatively short (e.g., have "short attributes" such as 8 bytes of data, etc.). When metadata attributes are short, compression of each of the metadata attributes individually may not result in efficient compression. For example, if a particular compression method is capable of reducing a large attribute size by a factor of 2, the compression of a short metadata attribute may result in negligible or no size reduction. Thus, in some instances it may be advantageous to aggregate (e.g., combine) several metadata attributes together into a combined attribute (e.g., data entity) that can then be more efficiently compressed and stored.

However, efficient storage and transfer of the metadata attributes are only two of the many concerns involved in the present disclosure, because the access and modification patterns of the metadata attributes also impact the overall system efficiency (e.g., speed, efficiency, bandwidth, overall computing power used, etc.). For example, metadata attributes that are commonly accessed and/or modified individually may not benefit from aggregation and compression because the additional computing power used to access and/or modify the individual metadata attribute may offset or negate the computing power saved due to the initial aggregation and/or compression. Further, in some instances the best overall system efficiency may be achieved by individually compressing the long metadata attributes, aggregating other metadata attributes together and compressing the aggregate, and/or not compressing other metadata attributes. Therefore, to provide the best overall system efficiency, systems, methods, and programs are disclosed for adaptively aggregating and compressing a plurality of metadata attributes related to one or more objects, where the selection of aggregation and/or compression depends on the individual and/or combined characteristics of the metadata attributes for the object, on the access patterns for the metadata attributes, and on the type of access and/or modification used for each of the metadata attributes.

FIG. 1 depicts a high-level component diagram of an example computing system 100 in accordance with one or more aspects of the present disclosure. The computing system 100 may include a server 180, one or more virtual machines (e.g., 170A), one or more containers (e.g., containers 170B-C), and one or more nodes (e.g., nodes 110A-C).

The server 180 may store metadata attributes (e.g., metadata attributes 184A-Q) either locally or remotely for various objects (e.g., objects 199A-C). The metadata attributes may be stored with or without the object and thus with or without the data associated with the object. In an example, objects 199A-C may be a user stored photo or an MP3 file. In the example of FIG. 1, the server 180 also stores objects 199A and 199C that are related to the metadata attributes 184A-C and 184K-M, respectively. However, the server 180 may also store the metadata attributes without also storing the object data, as shown by the metadata attributes 184D-J and 184N-Q within the server 180. In the example of FIG. 1, the objects 199A-B are stored within the virtual machine 170A, while the object 199C is stored within the container 170B. The objects 199A-C and the metadata attributes 184 A-Q may be organized via a file directory hierarchy or may have a single directory (e.g., "flat organization") in the virtual machine 170, in the containers 170B-C, and/or in the server 180. In another example, objects 199A-C may be different instances of the same file or files, so some or all of the metadata attributes may also be different instances of the metadata attributes. The metadata attributes (e.g., metadata 184A-Q) for the various objects may comprise descriptive metadata, structural metadata, preservation metadata, provenance metadata, use metadata, administrative metadata, etc. In an example, the metadata attributes (e.g., metadata attributes 184A-Q) may be applications artifacts, dependencies, XML, annotations, libraries, etc.

The virtual machine 170A and containers 170B-C may include virtual CPUs (VCPU), virtual memory devices (VMD), virtual input/output devices (VI/O), and virtual machine memory (VM Memory) (not shown).

In an example, the virtual machine 170A or containers 170B-C may execute one or more applications 198A-H as microservices, services, or processes and may use any execution environment. One or more of the applications may associated with each virtual machine 170A or container 170B-C. In the example of FIG. 1, applications 198A-C are associated with the virtual machine 170A, the applications 198D-E are associated with the container 170B, while the applications 198F-H are associated with the container 170C. It should be appreciated that the virtual machine 170A or containers 170B-C may be standalone execution environments. In the example of FIG. 1, the application 198A runs within a guest operating system 199A, the application 198B runs within a guest operating system 199B, and the application 198C runs within a guest operating system 199C. A hypervisor 190 software separates resources from the associated physical hardware and allows for partitioning and dedication of resources to the virtual machine 170A, while a host operating system 192A runs within the virtual machine 170A. Similarly, a host operating system 192B runs both of the containers 170B-C. In addition, the container 170B further comprises supporting runtime files 194A associated with the applications 198D-E, while the container 170C further comprises supporting runtime files 194B associated with the applications 198F-H.

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. The virtual machine 170A or the containers 170B-C may be provisioned on the same host or node (e.g., node 110A) or different nodes. For example, the virtual machine 170A and the container 170B may both be provisioned on node 110A. Alternatively, the virtual machine 170A may be provided on node 110A while the containers 170B-C are provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
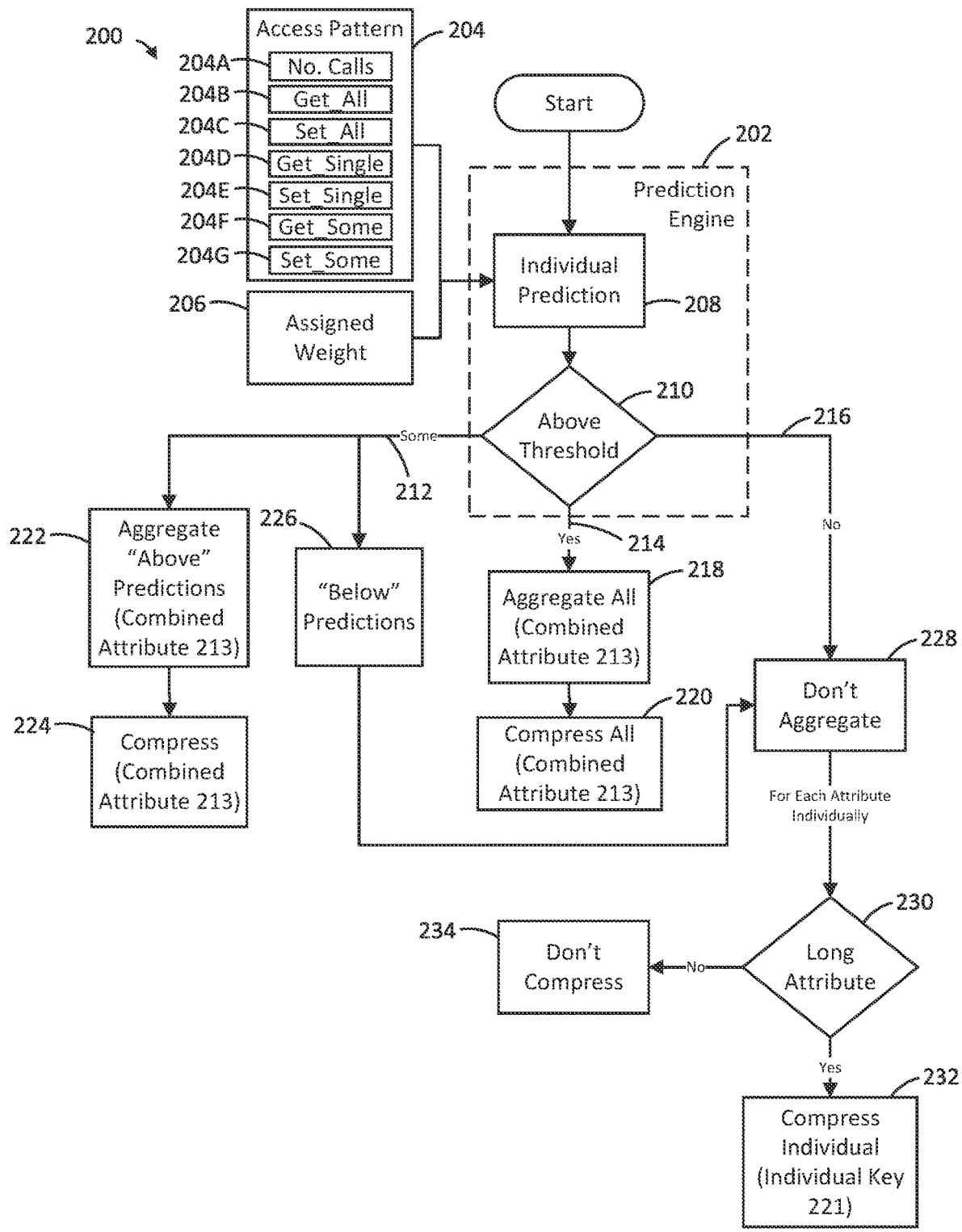
FIG. 2 illustrates a flowchart of a system for adaptively aggregating and compressing metadata according to an example embodiment of the present disclosure.

FIG. 2 illustrates a flowchart of a system 200 for adaptively aggregating and compressing metadata to be stored on the server 180. Although the example system 200 is described with reference to the flowchart illustrated in FIG. 2, it will be appreciated that many other systems of performing the acts associated with the system 200 may be used. For example, the order of some of the blocks may be changed, certain blocks may be combined with other blocks, blocks may be repeated, and some of the blocks described are optional. The system 200 may be performed by processing logic that may comprise hardware (circuitry, dedicated logic, etc.), software, or a combination of both.

The example system 200 includes a prediction engine 202 that inputs a plurality of metadata attributes related to an object and decides if the metadata attributes should be aggregated. To make the decision on aggregation, the prediction engine 202 inputs an access pattern 204 that describes statistics for how a user has accessed and/or modified each of the metadata attributes in the past (e.g., based on the type of call, and number of times accessed). For example, the access pattern 204 may comprise: a number of calls 204A that counts the number of times each metadata attribute has been accessed and the type of call or command used when accessing each metadata attribute (e.g., a Get_All command 204B, a Set_All command 204C, a Get_Single command 204D, a Set_Single command 204E, a Get_Some command 204F, and a Set_Some command 204G).

The Get_All command 204B refers to accessing all of the metadata attributes for a particular object together. The Set_All command 204C refers to modifying all of the metadata attributes for a particular object together. The Get_Single command 204D refers to accessing just one of the metadata attributes for a particular object. The Set_Single command 204E refers to modifying just one metadata attribute. The Get_Some command 204F refers to accessing two or more metadata attributes for a particular object together. The Set_Some command 204G refers to modifying two or more of the metadata attributes.

However, use statistics for each metadata attribute may not always be readily available, for example on the first time a metadata attribute is assigned, so non-statistical methods may also be used to establish an expected access pattern. The access pattern can then be updated iteratively (e.g., after a set "n-number" of calls) as use based statistics accumulate. Alternatively, the access pattern data 204 may be set based on expectations of how the user will access and/or modify each of the metadata attributes, or may be based on statistics of how similar metadata attributes where accessed and/or modified. In addition, an assigned weight 206 is applied to each of the metadata attributes by the prediction engine 202, where the assigned weight 206 relates to the type of call. Generally speaking, from an aggregation perspective, it is more efficient to aggregate multiple metadata attributes into a single combined attribute when the aggregated metadata attributes will be accessed and/or modified at least partially together, as opposed to only retrieving and/or modifying one of metadata attributes from the combined attribute. More specifically, the Get_Single 204D, Set_Single 204E, Get_Some 204F, and Set Some 204G are more costly in terms of computing efficiency (e.g., are less efficient) than Get_All 204B and Set_All 204C. Thus the assigned weights 206 will scale the "computing cost" of Get_All 204B, Set_All 204C, Get_Single 204D, Set_Single 204E, Get_Some 204F, and Set Some 204G by assigning larger or smaller values for the assigned weights 206.

As described further herein, the positive values indicate that aggregation is generally advantageous, while negative values indicate that aggregation is generally not desirable or beneficial from a computing power perspective. The absolute size of the values or integers assigned to each of the commands (204B-G) are arbitrary, however the relative size of the integers or values represents the relative costs or benefits of aggregating the metadata attributes in terms of relative computing power. Example assigned weights 206 are shown in the table below and show combinations of assigned weights 206 that may be used together in each example row.

| Example No. | Get_All 204B | Set_All 204C | Get_Single 204D | Set_Single 204E | Get_Some 204F | Set_Some 204G |
|---|---|---|---|---|---|---|
| Example 1 | 4 | 4 | −2 | −1 | −1 | −1 |
| Example 2 | 4 | 4 | −2 | −2 | −2 | −1 |
| Example 3 | 4 | 4 | −1 | −2 | −1 | −2 |
| Example 4 | 5 | 4 | −2 | −2 | −1 | −1 |
| Example 5 | 4 | 5 | −2 | −2 | −1 | −1 |

As shown in the table above, the assigned weights 206 for Get_All 204B and Set_All 204C generally positive values. The assigned weight 206 for Get_All 204B may be above, below, or equal to the assigned weight 206 for Set_All 204C. Additionally, the assigned weight 206 for Get_Single 204D and Set_Single 204E are generally negative values or values less than the assigned weights 206 for Get_All 204B and Set_All 204C. As shown in the table, the assigned weight 206 for Get_Single 204D may be above, below, or equal to the assigned weight 206 for Set_Single 204E. Additionally, the assigned weight 206 for Get_Some 204F and Set_Some 204G are generally negative values or values less than the assigned weights 206 for Get_All 204B and Set_All 204C. As shown in the table, the assigned weight 206 for Get_Some 204F may be above, below, or equal to the assigned weight 206 for Set_Some 204G. Also, any combination of assigned weights 206 previously described for the commands (204B-G) may be used in combination and are not shown in the example table.

In an example, the assigned weights 206 for each of the metadata attributes is multiplied by the number of calls of each of the metadata attributes and an individual prediction 208 is calculated. The individual prediction 208 for each metadata attributes is then compared in block 210 against a threshold to determine if the metadata attribute is a good candidate that would benefit from aggregation into a combined attribute 213. In an example, the threshold may be set to zero, such that any positive individual predictions 208 will be above the threshold and any negative individual predictions 208 will be below the threshold. However, the value for the threshold may not be zero in some examples and will be set according to the values chosen for the assigned weights 206. Generally speaking, the prediction engine 202 has three potential decision paths (paths 212, 214, 216), but the path 214 may be selected by two different methods of considering the individual predictions 208.

In a first scenario, the prediction engine 202 may be used to compare each of the individual predictions 208 against the threshold in block 210. If each of the individual predictions 208 are above the threshold, then the path 214 may be selected and all of the metadata attributes for the object would be aggregated in block 218 and then compressed in block 220.

In a second scenario, the prediction engine 202 may configured to calculate a sum of all of the individual predictions 208 for the metadata attributes for an object and form the combined attribute 213 with aggregated metadata attributes for the object having individual predictions 208 both above and below the threshold, when the sum is above the threshold. In this scenario, the total prediction would be above the threshold in block 210 and the path 214 could again be selected. In this manner, metadata attributes having both positive and negative assigned weights 206 may still be combined into the combined attribute 213 by aggregation.

If the path 214 is not selected by one of the two options described above, the prediction engine 202 will select the path 212 for objects having individual predictions 208 both above and below the threshold and will select the path 216 for objects having only one individual prediction 208 above the threshold or all individual predictions 208 below the threshold.

With regards to the path 212, the combined attribute 213 will be formed by aggregating the metadata attributes having individual predictions 208 above the threshold in block 222 and will compress the combined attribute 213 in block 224. The remaining metadata attributes below the threshold as shown in block 226 will not be aggregated, as shown by block 228, but will be checked for attribute length (e.g., file size) in block 230. Even though the access and/or modification characteristics of the metadata attributes may not benefit from aggregation (as determined by the prediction engine 202, previously described) the overall attribute length may still benefit from compression. The cut off for determining a "long attribute" is dependent on the specific compression algorithm or method used and therefore the absolute value for a long attribute is arbitrary in the context of the present disclosure. In an example, the long attribute is attribute having a length of 1 KB. Alternatively, in an example, the long attribute is attribute having a length of 2 KB. The block 230 will determine if the attribute is long, will individually compress long attributes into an individual key 221 in block 232, and will not compress attributes that are not long in block 234. In an embodiment, all of the metadata for an object will be stored together, with or without the associated object file. In addition, the metadata may be stored on a server, such as the example server 180 of FIG. 1. Thus, the server 180 may be configured to store the compressed combined attribute 213 of block 224, the individual key 221 of block 232, and any remaining uncompressed metadata attributes of block 234.

With regards to the path 216, the prediction engine 202 may select none of the metadata attributes for aggregation, as shown in block 228, for objects having only one individual prediction 208 above the threshold or all individual predictions 208 below the threshold. As previously described, each of the metadata attributes may still however be sufficiently long to benefit from compression, so the attribute length will be individually checked in block 230. Attribute that are determined to be long (e.g., would benefit from compression) will be individually compressed in block 232, while attributes that are not long will not be compressed as shown by block 234.

Figure 3:
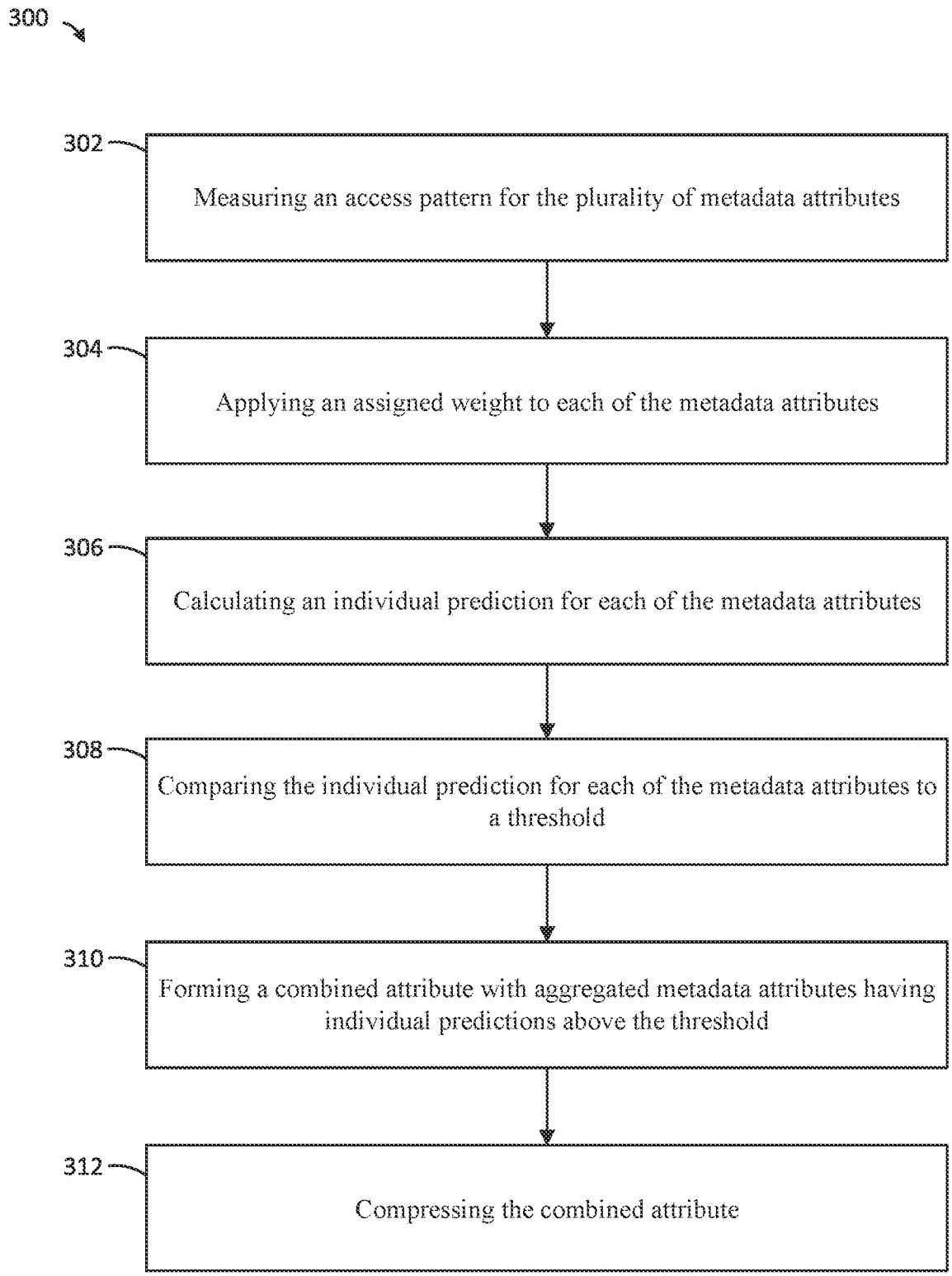
FIG. 3 illustrates a flowchart of a process for adaptively aggregating and compressing metadata according to an example embodiment of the present disclosure.

FIG. 3 illustrates a flowchart of a process 300 for adaptively aggregating and compressing metadata to be stored on the server 180. Although the process 300 is described with reference to the flowchart illustrated in FIG. 3, it will be appreciated that many other processes and methods of performing the acts associated with the process 300 may be used. For example, the order of some of the blocks may be changed, certain blocks may be combined with other blocks, blocks may be repeated, and some of the blocks described are optional. The methods of the process 300 may be performed by processing logic that may comprise hardware (circuitry, dedicated logic, etc.), software, or a combination of both.

Referring to FIGS. 2 and 3, the process 300 includes a block 302 for measuring an access pattern for the plurality of metadata attributes. In an example, the access pattern 204 is measured and includes a number of calls 204A and a type of call (204B-G) for each of the plurality of metadata attributes. In addition, the process 300 further includes a block 304 for applying an assigned weight to each of the metadata attributes. For example, an assigned weight 206 is applied to each of the metadata attributes based on the type of call (204B-G). Then in block 306 the process 300 includes calculating an individual prediction for each of the metadata attributes. For example, an individual prediction 208 is calculated for each of the metadata attributes based on the assigned weights 206 and the number of calls 204A. The process 300 further includes comparing the individual prediction for each of the metadata attributes to a threshold in block 308 and then forming a combined attribute with aggregated metadata attributes having individual predictions above the threshold in block 310. For example, the individual prediction 208 for each of the metadata attributes is compared to a threshold and then forms a combined attribute 213 with aggregated metadata attributes having individual predictions 208 that are above the threshold. Lastly, the process 300 includes compressing the combined attribute in block 312. As previously described for the system 200, the prediction engine 202 of the process 300 may include three potential decision paths (paths 212, 214, 216), but the path 214 may be selected by either all of the individual predictions being above the threshold or by the summation of all of the individual predictions being above the threshold. In addition, the process 300 may also include storing the metadata attributes on a server 180, wherein the metadata attributes may comprise one or more of: compressed combined attributes 213 of some of the metadata related to an object (block 224), compressed combined attributes 213 related to all of the metadata attributes for an object (block 220), not aggregated and uncompressed metadata attributes (block 234), individually compressed individual keys 221 (block 232), or combinations thereof.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system for aggregating and compressing a plurality of metadata attributes related to an object, the system comprising:
   a memory; and
   a processor in communication with the memory, wherein the processor is configured to:
      measure an access pattern for each of the plurality of metadata attributes, wherein the access pattern is based on calls made to each of the plurality of metadata attributes, and wherein the access pattern comprises a number of the calls made to each of the plurality of metadata attributes and a type of each of the calls made to each of the plurality of metadata attributes;
      assign an assigned weight to each of the metadata attributes based on the type of each of the calls made to each of the metadata attributes, wherein the assigned weight is a positive value or a negative value;
      calculate an individual prediction for each of the metadata attributes using the assigned weight and the number of the calls;
      compare the individual prediction for each of the metadata attributes to a threshold;
      form a combined attribute with aggregated metadata attributes having individual predictions above the threshold;
      compress the combined attribute; and
      store the compressed combined attribute and each of the metadata attributes having individual predictions equal to or below the threshold, wherein data storage consumption associated with storing the compressed combined attribute and the metadata attributes having individual predictions equal to or below the threshold is reduced in comparison to data storage consumption associated with storing the plurality of metadata attributes.

2. The system of claim 1, wherein the processor is a virtual processor, and wherein the virtual processor executes in a virtual machine.

3. The system of claim 1, wherein the processor is further configured to individually compress the metadata attributes that are below the threshold and have long attributes.

4. The system of claim 3, further comprising a server configured to store the compressed combined attribute, the individually compressed metadata attributes, and any remaining uncompressed metadata attributes.

5. The system of claim 4, wherein the server is a remote server.

6. The system of claim 4, wherein the server or processor is further configured to store the compressed combined attribute, the individually compressed metadata attributes, and any remaining uncompressed metadata attributes in a container.

7. The system of claim 1, wherein the individual prediction is calculated by multiplying the assigned weight and the number of the calls.

8. The system of claim 7, wherein the processor is further configured to calculate a sum of all of the individual predictions for the metadata attributes for the object and form the combined attribute with aggregated metadata attributes for the object having individual predictions both above and below the threshold, when the sum is above the threshold.

9. The system of claim 1, wherein the type of each of the calls is selected from a group comprising:
   a Get_All command that retrieves all of the plurality of metadata attributes for the object;
   a Set_All command that sets new values for all of the plurality of metadata attributes for the object;
   a Get_Single command that retrieves only one of the plurality of metadata attributes for the object;
   a Set_Single command that sets a new value for only one of the plurality of metadata attributes for the object;
   a Get_Some command that retrieves at least two of the plurality of metadata attributes for the object; and
   a Set_Some command that sets at least two of the plurality of metadata attributes for the object.

10. The system of claim 9, wherein:
the assigned weight for the Get_All command and the Set_All command are above the threshold; and
the assigned weight for the Get_Single command and the Set_Single command are below the threshold.

11. A method for aggregating and compressing a plurality of metadata attributes related to an object, the method comprising:
measuring an access pattern for each of the plurality of metadata attributes, wherein the access pattern is based on calls made to each of the plurality of metadata attributes, and wherein the access pattern comprises a number of the calls made to each of the plurality of metadata attributes and a type of each of the calls made to each of the plurality of metadata attributes;
assigning an assigned weight to each of the metadata attributes based on the type of each of the calls made to each of the metadata attributes, wherein the assigned weight is a positive value or a negative value;
calculating an individual prediction for each of the metadata attributes using the assigned weight and the number of the calls;
comparing the individual prediction for each of the metadata attributes to a threshold;
forming a combined attribute with aggregated metadata attributes having individual predictions above the threshold;
compressing the combined attribute; and
storing the compressed combined attribute and each of the metadata attributes having individual predictions equal to or below the threshold, wherein data storage consumption associated with storing the compressed combined attribute and the metadata attributes having individual predictions equal to or below the threshold is reduced in comparison to data storage consumption associated with storing the plurality of metadata attributes.

12. The method of claim 11, further comprising executing a processor as a virtual processor on a virtual machine.

13. The method of claim 11, wherein measuring the type of each of the calls comprises:
retrieving all of the plurality of metadata attributes for the object with a Get_All command;
setting new values for all of the plurality of metadata attributes for the object with a Set_All command;
retrieving only one of the plurality of metadata attributes for the object with a Get_Single command;
setting a new value for only one of the plurality of metadata attributes for the object with a Set_Single command;
retrieving at least two of the plurality of metadata attributes for the object with a Get_Some command; and
setting at least two of the plurality of metadata attributes for the object with a Set_Some command.

14. The method of claim 11, further comprising:
individually compressing the metadata attributes that are below the threshold and have long attributes; and
storing the compressed combined attribute, the individually compressed metadata attributes, and any remaining uncompressed metadata attributes on a server.

15. The method of claim 14, further comprising remotely storing the object on the server.

16. The method of claim 14, further comprising storing the compressed combined attribute, the individually compressed metadata attributes, and any remaining uncompressed metadata attributes in a container.

17. The method of claim 11, further comprising:
calculating the individual prediction by multiplying the assigned weight and the number of the calls;
calculating a sum of all of the individual predictions for the metadata attributes for the object; and
forming the combined attribute with aggregated metadata attributes for the object having individual predictions both above and below the threshold, when the sum is above the threshold.

18. A non-transitory machine-readable medium storing a program, which when executed by at least one processor, is effective to aggregate and compress a plurality of metadata attributes related to an object, the program comprising:
measure an access pattern for each of the plurality of metadata attributes, wherein the access pattern is based on calls made to each of the plurality of metadata attributes, and wherein the access pattern comprises a number of the calls made to each of the plurality of metadata attributes and a type of each of the calls made to each of the plurality of metadata attributes;
assign an assigned weight to each of the metadata attributes based on the type of each of the calls made to each of the metadata attributes, wherein the assigned weight is a positive value or a negative value;
calculate an individual prediction for each of the metadata attributes using the assigned weight and the number of the calls;
compare the individual prediction for each of the metadata attributes to a threshold;
form a combined attribute with aggregated metadata attributes having individual predictions above the threshold;
compress the combined attribute; and
store the compressed combined attribute and each of the metadata attributes having individual predictions equal to or below the threshold, wherein data storage consumption associated with storing the compressed combined attribute and the metadata attributes having individual predictions equal to or below the threshold is reduced in comparison to data storage consumption associated with storing the plurality of metadata attributes.

* * * * *